(12) United States Patent
Silverstein et al.

(10) Patent No.: US 11,455,461 B2
(45) Date of Patent: Sep. 27, 2022

(54) SELF-EXECUTING DOCUMENT REVISION

(71) Applicant: INTERNATIONAL BUSINESS MACHINES CORPORATION, Armonk, NY (US)

(72) Inventors: Zachary A. Silverstein, Austin, TX (US); Kelley Anders, East New Market, MD (US); Jonathan D. Dunne, Dungarvan (IE); Qi Li, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 103 days.

(21) Appl. No.: 17/147,303

(22) Filed: Jan. 12, 2021

(65) Prior Publication Data
US 2022/0222429 A1  Jul. 14, 2022

(51) Int. Cl.
*G06F 3/0484* (2022.01)
*G06F 40/169* (2020.01)
(Continued)

(52) U.S. Cl.
CPC ............ *G06F 40/169* (2020.01); *G06F 3/013* (2013.01); *G06F 16/93* (2019.01); *G06F 40/197* (2020.01); *G06F 40/30* (2020.01); *G06N 7/005* (2013.01)

(58) Field of Classification Search
CPC ........ G06F 40/169; G06F 3/013; G06F 16/93; G06F 40/197; G06F 40/30; G06N 7/005
See application file for complete search history.

(56) References Cited

U.S. PATENT DOCUMENTS

| 5,671,428 A | 9/1997 | Muranaga et al. |
| 7,698,421 B2 | 4/2010 | Bernard et al. |

(Continued)

FOREIGN PATENT DOCUMENTS

CN     102262620 A  * 11/2011  ......... G06F 17/2229

OTHER PUBLICATIONS

"Versioning Actions, Document-related actions have an effect on the version status of a document," [online] IBM Knowledge Center, IBM FileNet P8, Version 5.2.1, Updated Mar. 2016, IBM Corporation © Copyright 2017, retrieved from the Internet: <https://www.ibm.com/support/knowledgecenter/SSNW2F_5.5.0/com.ibm.p8.ee.admin.tasks.doc/docsandfolders/df_versioning_actions.htm>, 7 pg.

*Primary Examiner* — Hassan Mrabi
(74) *Attorney, Agent, or Firm* — Cuenot, Forsythe & Kim, LLC

(57) ABSTRACT

Self-executing document revision includes creating a current version of an electronic rendering of a collaborative document based on input received from a user via a communicative coupling with a data communications network. The current version's relevancy is determined by a self-executing document revisor and compared with the relevancy of a prior version of the collaborative document. In response to determining the relevancy of the current version is less than the relevancy of the prior version, one or more segments of one or more electronically stored versions of the collaborative document are selected based on a relevancy of each of the one or more segments, the relevancy of each determined by the self-executing document revisor. The self-executing document revisor generates a graphical representation of a revised version of the collaborative document by merging the one or more segments selected with the current version of the collaborative document.

20 Claims, 9 Drawing Sheets

(51) Int. Cl.
*G06F 16/93* (2019.01)
*G06F 40/197* (2020.01)
*G06F 3/01* (2006.01)
*G06F 40/30* (2020.01)
*G06N 7/00* (2006.01)

(56) References Cited

U.S. PATENT DOCUMENTS

| | | | |
|---|---|---|---|
| 9,367,530 B2* | 6/2016 | Antebi | G06F 16/1834 |
| 2004/0215664 A1 | 10/2004 | Hennings et al. | |
| 2004/0230894 A1 | 11/2004 | Elza et al. | |
| 2008/0177782 A1* | 7/2008 | Poston | G06F 40/197 |
| | | | 707/999.102 |
| 2009/0282462 A1* | 11/2009 | Skaria | G06F 16/93 |
| | | | 726/3 |
| 2011/0093471 A1 | 4/2011 | Brockway et al. | |
| 2012/0151379 A1* | 6/2012 | Schultz | H04L 51/08 |
| | | | 715/752 |
| 2013/0117376 A1 | 5/2013 | Filman et al. | |
| 2014/0032502 A1* | 1/2014 | Kraley | G06F 40/197 |
| | | | 707/663 |
| 2014/0095973 A1 | 4/2014 | Chu et al. | |
| 2014/0372370 A1 | 12/2014 | Massand | |
| 2015/0052100 A1 | 2/2015 | Calkowski et al. | |
| 2019/0155870 A1* | 5/2019 | Prakash | G06F 40/103 |
| 2019/0212878 A1* | 7/2019 | Otero | G06F 16/289 |
| 2019/0250780 A1* | 8/2019 | Feng | G06F 3/0484 |
| 2020/0099763 A1* | 3/2020 | Goicochea | H04N 1/32144 |

* cited by examiner

600

Create a current version of an electronic rendering of a collaborative document based on input received from a user via a communicative coupling with a data communications network
602

Determine a relevancy of the current version of the collaborative document and comparing the relevancy of the current version with a relevancy of a prior version of the collaborative document
604

Select one or more segment of one or more electronically stored versions of the collaborative document based on a relevancy of each of the one or more segments in response to determining the relevancy of the current version is less than the relevancy of the prior version
606

Generate a graphical representation of a revised version of the collaborative document in which the one or more segments selected are merged with the current version of the collaborative document
608

FIG. 6

SELF-EXECUTING DOCUMENT REVISION

BACKGROUND

This disclosure relates to document sharing on networking platforms, and more particularly, to collaboratively creating documents.

The Internet and various other types of data communications networks provide an efficient mechanism for sharing documents. A shared document can be iteratively revised by a team of individuals using, for example, collaboration tools. Collaboration tools can be provided by an on-premises system or other type of document management system or through a subscription-based cloud deployment.

SUMMARY

In one or more embodiments, a method includes creating a current version of an electronic rendering of a collaborative document based on input received from a user via a communicative coupling with a data communications network. The method includes determining with a self-executing document revisor a relevancy of the current version of the collaborative document and comparing the relevancy of the current version with a relevancy of a prior version of the collaborative document. The method includes selecting one or more segments of one or more electronically stored versions of the collaborative document based on a relevancy of each of the one or more segments in response to determining the relevancy of the current version is less than the relevancy of the prior version, the relevancy of each of the one or more segments determined by the self-executing document revisor. The method includes generating with the self-executing document revisor a graphical representation of a revised version of the collaborative document in which the one or more segments selected are merged with the current version of the collaborative document.

In one or more embodiments, a system includes a processor configured to initiate operations. The operations include creating a current version of an electronic rendering of a collaborative document based on input received from a user via a communicative coupling with a data communications network. The operations include determining a relevancy of the current version of the collaborative document and comparing the relevancy of the current version with a relevancy of a prior version of the collaborative document. The operations include selecting one or more segments of one or more electronically stored versions of the collaborative document based on a relevancy of each of the one or more segments in response to determining the relevancy of the current version is less than the relevancy of the prior version. The operations include generating a graphical representation of a revised version of the collaborative document in which the one or more segments selected are merged with the current version of the collaborative document.

In one or more embodiments, a computer program product includes one or more computer readable storage media having instructions stored thereon. The instructions are executable by a processor to initiate operations. The operations include creating a current version of an electronic rendering of a collaborative document based on input received from a user via a communicative coupling with a data communications network. The operations include determining with a self-executing document revisor a relevancy of the current version of the collaborative document and comparing the relevancy of the current version with a relevancy of a prior version of the collaborative document. The operations include selecting one or more segments of one or more electronically stored versions of the collaborative document based on a relevancy of each of the one or more segments in response to determining the relevancy of the current version is less than the relevancy of the prior version, the relevancy of each of the one or more segments determined by the self-executing document revisor. The operations include generating with the self-executing document revisor a graphical representation of a revised version of the collaborative document in which the one or more segments selected are merged with the current version of the collaborative document.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 6 is a flowchart of an example method of revising a document using a self-executing document revisor according to an embodiment.

DETAILED DESCRIPTION

Figure 1:
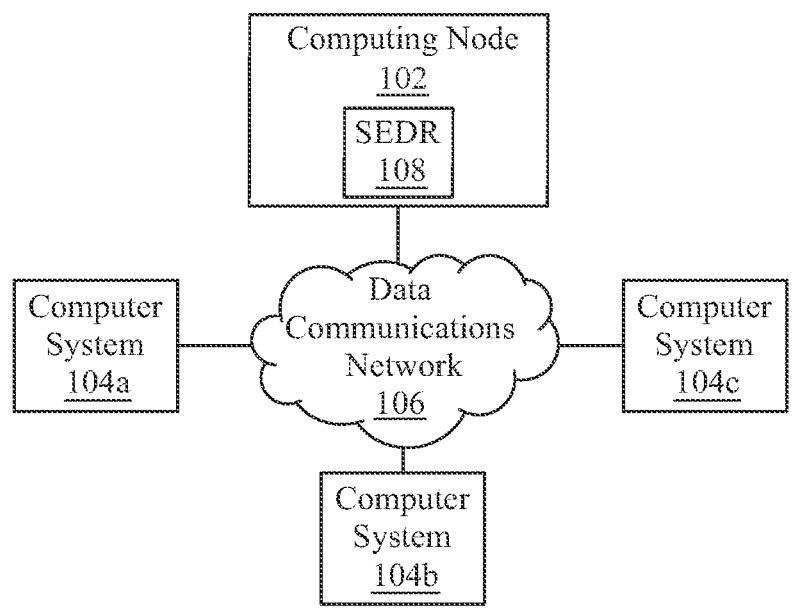
FIG. 1 depicts an example communicating and computing environment according to an embodiment.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to document sharing on networking platforms, and more particularly, to collaboratively creating electronic documents. Collaborative document development allows multiple individuals to participate in creating and revising a document. As a collaborative document develops over time, the number of versions of the document can increase significantly. One drawback of having numerous versions created through multiple revisions by multiple users is the difficulty in determining which portions of older content, since removed or excised, nonetheless remains relevant and important to the collaborative document. Moreover, determining relevancy of distinct portions of different versions typically depends on the subjective judgment of each user. As revisions multiply, judgment may be clouded by an individual user's inability to recall all facets of earlier versions. As the number of collaborators increases and the revisions multiply, users can easily lose track of content that is modified or removed as the document evolves. The likelihood that the individual may overlook portions that retain relevancy increases as the number of revisions and collaborators increase.

An aspect of the systems, methods, and computer program products disclosed herein is the automatic revision of collaborative documents based on machine-determined relevancies of segments of the documents. The machine-determined relevancy obviates the need for human judgment, which may be adversely affected by numerous revisions to a document made by multiple users over an extended time interval. "Relevancy," as defined herein, is a quantitative measure of the logical importance of a segment of a document to the document as a whole. In accordance with different arrangements disclosed herein, different metrics are used for objectively measuring, using a computer system, the relevance of a segment of a document. Metrics for measuring relevancy include the number of positive comments received by a segment of a document, the number of views garnered by the segment, and/or the number of terms likely relevant, in a probabilistic sense, to the topic of the segment as determined by topic modeling and linguistic analysis. The relevance of a document as a whole can be measured based on relevancies of distinct segments of the document. Accordingly, the relevance of a newly revised version of a document can be compared to one or more prior versions to determine whether the revision has reduced the relevancy of the document.

For example, the relevancy of a segment can be measured as the summation of the number of terms having probabilistic relevance to a particular topic, wherein the probabilistic relevance of a term corresponds to the probability (e.g., log-likelihood probability) that the term appears in a document pertaining to the topic. Thus, according to metrics used herein, the more likely it is that a term is found in a document related to a topic, the more relevant the term is likely to be with respect to the topic. A revision of a document that reduces the number of relevant terms so identified, for example, reduces the relevancy of one or more segments pertaining to a predetermined topic and corresponds to a decrease in relevancy of the document owing to the revisions.

Another objective metric of relevancy is the amount of time (e.g., measured by eye gaze tracking) one or more users (e.g., collaborators) spend viewing a segment of a document. The greater the amount of time, the more likely the segment has a particular relevance to the document. A revision of the document that removes the segment reduces the relevancy of the document. Other metrics include the number of comments a segment elicits, the number of revisions made to a segment, and the length of time a segment is included in a document over the lifecycle of the document. Revisions that remove such segments, correspondingly reduce the relevancy of the document.

Thus, by providing a quantitative measure of relevancy of a document and the document's individual segments, a machine-based determination can be made whether a revision to a segment of the document reduces the document's relevancy relative to an earlier version. An automatic revision, based on machine-determined relevancy, is made to a collaborative document to ensure that the document's relevancy does not diminish as a result of a user's revision of the document.

Accordingly, another aspect of the systems, methods, and computer program products is automatically responding to a change in a document's relevancy owing to a revision. Given numerous revisions to a document it is impractical or impossible for a user—especially in the context of a team collaboration—to track all relevant content of a document. Using a machine-determined measure of relevancy, relevant segments are automatically selected and promoted into a current version of a document to bolster the document's relevancy in response to the relevancy having been diminished by a user's revisions. More fundamentally, without reviewing a complete lifecycle of revisions to the document, the user may not discern which revisions diminish a document's relevancy and further still may not identify removed content that should be reinserted into the document to retain or recapture the document's relevancy.

The arrangements described herein are directed to computer technology and provide an improvement to existing computer technology. The arrangements improve computer technology by providing an automatic response to a user input that revises a document. The arrangements automatically determine the relevancy of the document, as revised by the user input, and respond automatically to restore a relevancy diminished by the user's revisions. Specifically, the arrangements automatically select electronically stored prior content—previously revised or removed from the document—based on an objectively measured, machine-determined relevancy of the prior content. The prior content so selected is automatically promoted into a current version of the document. The output is a graphical representation of the document in which, independent of additionally received user input, one or more segments selected based on an objectively measured relevancy are merged into a current version of the document, thereby retaining or enhancing the document's relevancy.

In accordance with certain arrangements described herein, a baseline or "ground truth" of relevancy of a document is automatically determined by computer technology based on an initial version of the document. In some arrangements, a user-specified profile can indicate one or more topics that a document is to include regardless of the number of revisions that the document undergoes. Initial relevance of the document can be machine-determined based on the number of topic-specific terms that, based on topic modeling, have predetermined probabilistic relevance with respect to the indicated topic(s). The topic(s) and corresponding relevancy can provide a ground truth for assessing subsequent revisions to the document. Moreover, the document's relevancy can change with subsequent revisions. The relevancy can increase if one or more segments, for example, receive positive comments. The relevancy can increase, for example, if one or more segments are revised such that, as revised, the segment(s) include terms that have greater relevance, in a probabilistic sense, to the indicated topics.

Various metrics can be used to measure the changes in relevancy as the document undergoes revision. If, for whatever reason, a revision yields a document version whose machine-determined relevancy is enhanced, then that version may be used as the new ground truth.

Conversely, however, if a revision reduces the document's relevancy, an automatic search may be performed of electronically stored portions of one or more earlier versions of the document. Based on a corresponding relevancy or relevancies of one or more electronically stored portions, one or more of the portions can be automatically selected for promoting into the latest revision of the document to restore the document's relevancy.

Further aspects of the embodiments described within this disclosure are described in greater detail with reference to the figures below. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figure 9:
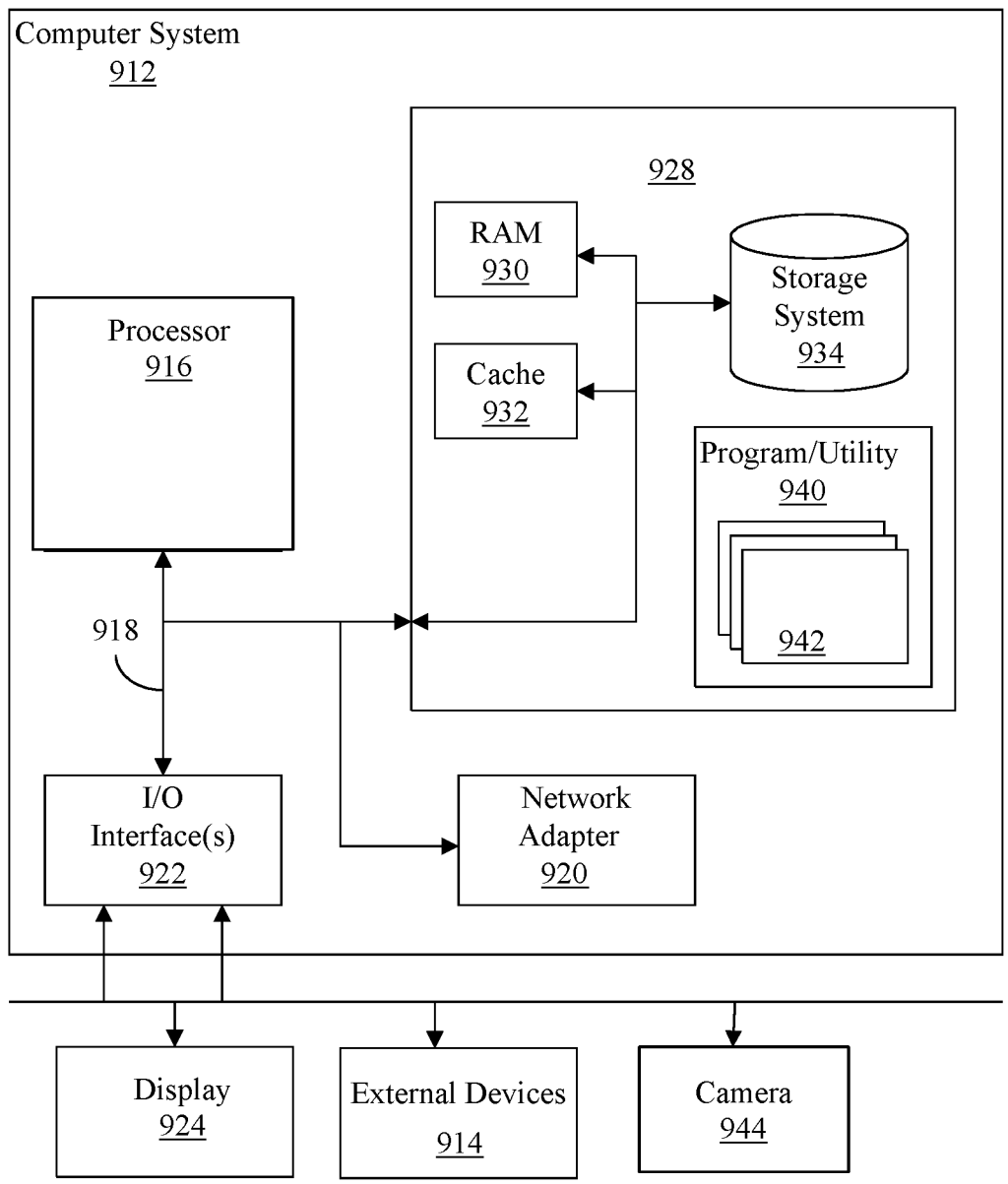
FIG. 9 depicts a cloud computing node according to an embodiment.

FIG. 1 depicts example communication and computing environment 100. Communication and computing environment 100 illustratively includes computing node 102 and computer systems 104a, 104b, and 104c, which are communicatively coupled with computing node 102 via data communications network 106. Computing node 102 can include one or more of the components described with reference to example computing node 900 (FIG. 9). Computer systems 104a-104c can each comprise a memory, one or more processors, and other components such as ones described with reference to computer system 912 (FIG. 9). Although three computer systems are shown, an environment such as communication and computing environment 100 can include fewer, or more typically, more such computer systems.

Computing node 102 can comprise a server (e.g., a cloud-based server) that hosts a subscription-based collaborative system or an enterprise server that hosts an enterprise-wide collaborative system. The collaborative system enables users of computer systems 104a-104c to collaboratively create a document by sharing electronic copies of the document, iteratively reviewing and revising the electronic copies, and commenting on different versions of the document, referred to herein as a collaborative document. Operatively, users of computer systems 104a-104c jointly engage in the aforementioned activities using the collaborative system hosted by computing node 102 and accessed via wired or wireless connections to data communications network 106. Data communications network 106 can include the Internet, one or more wide area networks (WANs), one or more local area networks (LANs), and/or various other data communications networks.

Communication and computing environment 100 additionally includes self-executing document revisor (SEDR) 108 integrated in the collaborative system hosted by computing node 102. In other embodiments, SEDR 108 can be implemented in a separate computing node and can operatively couple with the collaborative system via data communications network 106. SEDR 108 can be implemented in computer hardware, software, or a combination thereof. Operatively, SEDR 108 determines, based on objective criteria described herein, the relevancies of segments of prior versions of a collaborative document, the prior versions electronically stored as a collaborative document corpus. Relevancy is determined by SEDR 108 using a model created with machine learning applied to data comprising collaborative document corpora. In certain embodiments, the collaborative document corpora include collaborative document corpora specific to certain enumerated topic domains. The collaborative document corpora can be enhanced with each new collaborative document processed by SEDR 108.

A current version of a collaborative document can be created by one of a collaborative group of users revising the document, thereby creating a new current version. The current version is an electronic rendering of the collaborative document that is created in response to input received from the user via a communicative coupling with a data communications network to a collaborative system. The revisions can include a re-write or removal of one or more segments. SEDR 108 automatically responds to the user input to the collaborative system by comparing the relevancy of the current version with that of a prior version.

In response to determining that the relevancy of the current version is less than the relevancy of the prior version by the predetermined amount, SEDR 108 selects one or more segments of one or more electronically stored versions of the collaborative document for promotion to the current version. SEDR 108, in accordance with certain arrangements described below, selects one or more electronically stored segments of a prior version by initially determining the topic (based on topic modeling) of the segment revised (e.g., re-written or removed) in the current version and then searching for a similar segment (based on linguistic analysis) corresponding to the same topic. SEDR 108 can select an electronically segment(s) having the highest relevancy. A highest relevancy can be determined by a ranking mechanism in which each segment's content that is determined to be relevant is assigned an ordinal ranking.

In certain embodiments, also described below, the relevancy can be based on the number of key terms occurring in the segment and corresponding to the identified topic or other such relevancy metric. The number of key terms can correspond to an ordinal ranking. The relevancy, additionally or alternatively, can be based on the number of views a segment garners and/or the number of comments a segment receives from the group of collaborative users. The number of views can correspond to an ordinal ranking. In certain embodiments, relevancy is the number of positive comments (based on sentiment analysis) less the number of negative comments received by each segment. Relevancy in other embodiments can correspond to the number of comments seeking a clarification regarding the segment. The numbers of comments can corresponding to an ordinal ranking. Various other relevancy metrics can be used by SEDR 108 to determine an ordinal ranking for selecting one or more segments to promote for addition to the latest version of a collaborative document. The different metrics can be aggregated to determine the ordinal ranking for selecting one or more segments for promoting to a current version of a collaborative document to bolster the collaborative document's relevancy.

In response to selecting one or more segments based on their respective machine-determined relevancies, SEDR 108 automatically revises the collaborative document, generating a graphical representation of the revised version of the collaborative document in which the one or more segments selected are merged with the current version of the collaborative document. Thus, automatic revisions to the collaborative document can be invoked by SEDR 108 detecting an adverse change in relevancy of the collaborative document relative to a prior version, the relevancy being an overall document relevancy based on machine-determined relevancies of distinct segments of the collaborative document, as described above.

Figure 2:
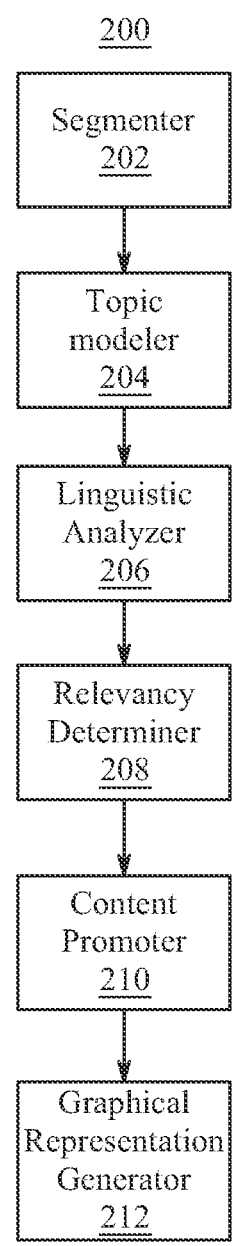
FIG. 2 depicts an example self-executing document revisor according to an embodiment.

FIG. 2 depicts example SEDR 200 according to an embodiment. In one aspect, SEDR 200 is an example implementation of SEDR 108 of FIG. 1. SEDR 200 is implemented in software that is electronically stored in a memory and executes on one or more processors such as memory 928 and processor(s) 916 of computer system 912 (FIG. 9). Illustratively, SEDR 200 includes segmenter 202, topic modeler 204, linguistic analyzer 206, relevancy determiner 208, content promoter 210, and graphical representation generator 212, each comprising a software module stored in electronic memory and executable on one or more processors of a computer system such as computer system 912 (FIG. 9).

Operatively, SEDR 200 initially responds to revisions made to a collaborative document. The revisions can be made by one of multiple users who work collaboratively on a document, thereby producing a series of revisions to the document. With the most recent revision, a current version of the collaborative document is generated. As newer versions are created with successive iterative revisions, the different versions are added to a database comprising a collaborative document corpus. Segmenter 202 segments each version of the collaborative document into distinct portions or segments. In certain embodiments, segmenter 202 identifies paragraphs within the text of a document based on the text format of the document and segments each version of the document into individual, distinct paragraphs. In other embodiments, each version of the document can be segmented according to other criteria. For example, each segment can comprise a block of text containing a predetermined number of words. Headings, subheadings, and a table of contents may also be used to segment the document in cases where the document includes such formal demarcations.

Topic modeler 204, with respect to each version, discovers one or more topics for each document segment. Topic modeler 204 can use probabilistic topic modeling, such as latent Dirichlet allocation or bi-term analysis, or other known topic modeling algorithms to discover one or more topics of each distinct segment of a collaborative document.

One aspect of topic modeling by topic modeler 204 is the determination of the probabilities that certain terms (e.g., words of a predetermined vocabulary) occur within a document (or specific segment) given the topical content of the document. The probability can be a log-likelihood or other probability measure between zero and one. SEDR 200, according to certain arrangements, uses the probability as an indicator of the probabilistic relevance of terms within the document. The greater is the probability that a term is associated with a particular topic, the more relevant that term is likely to be with respect to the topic. Accordingly, SEDR 200 can use the probabilities to identify key terms. A key term can be identified as a term whose topic-related probability (determined by topic modeling) is greater than a predetermined value, which corresponds to the degree of relevancy of the term in a probabilistic sense.

Linguistic analyzer 206 can use natural language processing to extract information from textual content of segments of the document. Linguistic analyzer 206 can used corpus linguistic processing techniques to determine term frequencies of the key terms within the document (or document segment), as well as colligations and collocations of related terms. Both collocations and colligations can be used to extract meaningful lexi-graphical tuples of triples of words, which can then be surfaced and enumerated Linguistic analyzer 206 can determine whether and which segments within distinct versions of a collaborative or other document are similar with respect to the identified topics of each. In certain embodiments, linguistic analyzer 206 determines semantic similarity between document versions and/or segments of the different versions based on cosine similarity. The cosine similarity is:

$$\cos(\theta) = \frac{A \cdot B}{\|A\|\|B\|} = \frac{\sum_{i=1}^{n} A_i B_i}{\sqrt{\sum_{i=1}^{n} A_i^2} \sqrt{\sum_{i=1}^{n} B_i^2}},$$

wherein A and B are vectors, or n-tuples, corresponding to two distinct versions of a document or specific segment, and wherein the values of each of the n elements of each vector correspond to the number of times a term appears in a version of the document or segment. Accordingly, cosine similarity provides a quantitative measure of semantic closeness between two versions based on the cosine of the angle between the vector representations of the different versions.

These attributes, in various embodiments, are used by relevancy determiner 208 to determine relevancies associated with segments of a collaborative document and dictate whether content promoter 210 merges a segment of a prior version of the document into a current version of the document.

Relevancy determiner 208 can use a metric based on topic-specific key terms (identified by topic modeler 204) and the term frequency (determined by linguistic analyzer 206) of each such term.

For example, consider a document about using data analysis to determine the number of genes an organism needs to survive in an evolutionary sense. Depending on the terms in the document, topic modeler 204 may identify data analysis, genetics, and evolutionary biology as the predominant topics. Terms pertaining to the topic data analysis, with associated probabilities, can include data 0.02, number 0.02, and computer 0.01. Terms pertaining to genetics, with associated probabilities, can include gene 0.04, dna 0.02, and genetic 0.01. A paragraph or segment of the document that predominantly concerns data analysis may use the term data three times, the term number one time, and the term computer two times. Accordingly, the relevancy of the paragraph determined by relevancy determiner 208 is $$\text{Relevancy}_{data\ analysis} = 3(0.02) + (0.02) + 2(0.01) = 0.10.$$

Relevancy determiner 208 can determine a relevancy of the entire document by summing the topic-specific paragraph or segment relevancies. For example, if the document contains two paragraphs whose dominant topic is data analysis, with respective relevancies 0.10 and 0.50, and one paragraph each pertaining to genetics and evolutionary biology with respective relevancies 0.20 and 0.50, the document's relevancy determined by relevancy determiner 208 is $$\text{Relevancy}_{document} = 0.10 + 0.50 + 0.20 + 0.5 = 2.20.$$

Relevancy based on the topic-specific metric thus can be computed as the summation of the topic-associated probabilities of the key terms, given a specific topic, that appear in a collaborative document or document segment. Thus, if a revision reduces the preponderance of key terms, in the document or segment, the relevancy (determined by the metric) of the document or segment decreases commensurately.

Additionally, or alternatively, relevancy can be measured by the number of comments a segment garners as multiple users review various versions of the collaborative document. The greater the comments garnered, the more likely the segment has importance to various reviewers, for example. Topic analyzer 204 also can identify topic-specific terms included in the comment, and linguistic analyzer 206 can determine term frequencies associated with the terms in the comment. The frequency with which a key term appears in one or more comments is added to the number of times the term appears in one or more revisions to the collaborative document and heightens the relevancy of the term, as indicated by the specific relevancy metric.

Another additional or alternative metric for measuring relevancy is the number of times that a segment is viewed or otherwise consumed. As defined herein, a user "consumes" a segment by retrieving the segment via a data communications network with the segment being rendered (e.g., displayed or played as audio), or by tagging the article to indicate the user's having read the segment or by electronically commenting on the segment.

In some embodiments, SEDR 200 includes a timing mechanism to measure the time that a user accesses a specific segment, regardless of whether the user revises or comments on the segment. Each segment can be associated with a minimum read time (e.g., average reading time (words per minute) times the number of words). If the user accesses the segment for at least the minimum read time, then SEDR 200 counts the segment as consumed by the user.

In other embodiments, SEDR 200 communicatively couples to a device-embedded camera of the device the user uses to access the document and, based on images of the user captured with the camera, determines whether and for how long the user viewed the specific segment. SEDR 200 can generate based on captured images a gaze vector, which determines the pitch and yaw of the user's gaze with respect to the camera. SEDR 200 can determine a specific point that the user is looking at on a screen in front of the user by estimating the position of the display screen with respect to the camera as an aspect of screen calibration.

An objective of SEDR 200 is to reduce a likelihood that the relevancy of a document is reduced over the document's lifecycle of iterative revisions. A document's relevancy can be diminished in various ways. For example, a segment of the document may be revised (e.g., rewritten) in such a way that while the dominant topic of the segment is preserved the revision nonetheless reduces the segment's relevancy. Specifically, keywords (identified by topic modeler 204) may be removed or replaced by less relevant terms. The syntax of the segment (determined by linguistic analyzer 206) may be altered in a way that reduces relevancy. A segment may be eliminated altogether thereby reducing the overall relevancy of the document. By providing a quantitative measure of relevancy of the document and the document's individual segments, SEDR 200 automatically recognizes a reduction in relevancy and automatically responds accordingly.

Content promoter 210 selects for promoting to a current version the collaborative document one or more segments from one or more prior document versions stored electronically. The segment(s) are selected based on the segments' topics and respective relevancies. The one or more segments selected are extracted and electronically conveyed to graphical representation generator 212, which generates a revised version of the document that merges the selected segment(s) into the document generated by the latest input from a user to boost the quantitative relevancy of the document.

In various embodiments, a user can elect among alternative, distinct conditions for invoking a database search for relevancy-enhancing segments by content promoter 210. One invoking condition is a decline in the relevancy of the (i-th+1) version of a collaborative document with respect to the relevancy of the i-th version of the document. A decline of any magnitude can invoke a search by content promoter 210. Alternatively, a decline by more than a predetermined amount can constitute the condition for invoking the search. Yet another condition is a predetermined relevancy benchmark, such that the search by content promoter 210 is automatically invoked if a revision results in a version whose relevancy is less than the predetermined value. In some embodiments, content promoter 210 searches for and selects a segment having the highest relevancy pertaining to a specifically identified topic In other embodiments, a user can elect to have content promoter 210 search for, select, and retrieve a segment that is removed from the current version of a document if the segment is one that was heavily viewed in previous versions. The relevancy measure determined by relevancy determiner 208 for each of a document's segments can comprise the number of "views" (determined by eye gaze tracking) that a segment receives or how many times each segment is consumed. The user can select a predetermined value for the relevancy based on number of views. SEDR 200 electronically tracks and records the number of views of each segment of a document. A user revision that removes from a current version of the document a segment that has been viewed more than the predetermined number of times invokes action by content promoter 210, whereby content promoter 210 selects and retrieves the segment and reinserts the segment in the current version of the document.

In other embodiments, a user can elect to have content promoter 210 search for, select, and retrieve a segment that is removed from the current version of a document if the segment is one that was heavily commented on in previous versions. The relevancy measure determined by relevancy determiner 208 for each of a document's segments can comprise the number of comments added to a segment. The user can choose a predetermined value for the relevancy based on the number of comments. SEDR 200 electronically tracks and records the number of comments each segment of a document receives. A user revision that removes from a current version of the document a segment that has received more than the predetermined number of comments invokes the action by which content promoter 210 selects and retrieves the segment and reinserts the segment in the current version of the document.

In still other embodiments, linguistic analyzer 206 can incorporate a sentiment analyzer that determines the sentiment (e.g., positive, negative, neutral) of a comment based on a natural language processing of the text of the comment. The relevancy measure determined by relevancy determiner 208 for each of a document's segments can comprise the number of comments that based on the sentiment analysis are positive. The user can choose a predetermined value for the relevancy based on number of positive comments. SEDR 200 electronically tracks and records the number of positive comments on each segment of a document. In response to SEDR 200 detecting that a user revision removes from a current version of the document a segment that has received more than the predetermined number of positive comments, SEDR 200 invokes the action by which content promoter 210 retrieves the segment and reinserts the segment in the current version of the document. Optionally, a comment that based on sentiment analysis is deemed negative, can be used to reduce a segment's relevancy by the number of negative comments the segment receives.

In yet other embodiments, SEDR 200 determines and records the time that each segment is incorporated in the document. A segment's relevancy measure determined by relevance determiner 208 can be based on the length of time that a segment has been part of a document over the document's lifecycle. The user can choose a predetermined value for the time that a segment has been part of the document. Accordingly, in response to SEDR 200 detecting that a user revision removes from a current version of the document a segment that has been part of the document longer than the predetermined length of time, SEDR 200 invokes the action by which content promoter 210 selects and retrieves the segment and reinserts the segment in the current version of the document.

In response to content promoter 210 promoting one or more segments selected from one or more electronically stored prior versions of the document based on a relevancy of each, SEDR 200 outputs a graphical representation generated by graphical representation generator 212. The graphical representation is a revised version of the document in which the one or more segments promoted by content promoter 210 are merged with the version as revised by user input.

Another aspect of an SEDR 200 is the generation of domain-specific models used by SEDR 200 for topic discovery and natural language understanding. Each domain can correspond to a distinct area of knowledge (e.g., computer science, electrical engineering, mathematics) that is the subject matter of a collaborative document.

Figure 3:
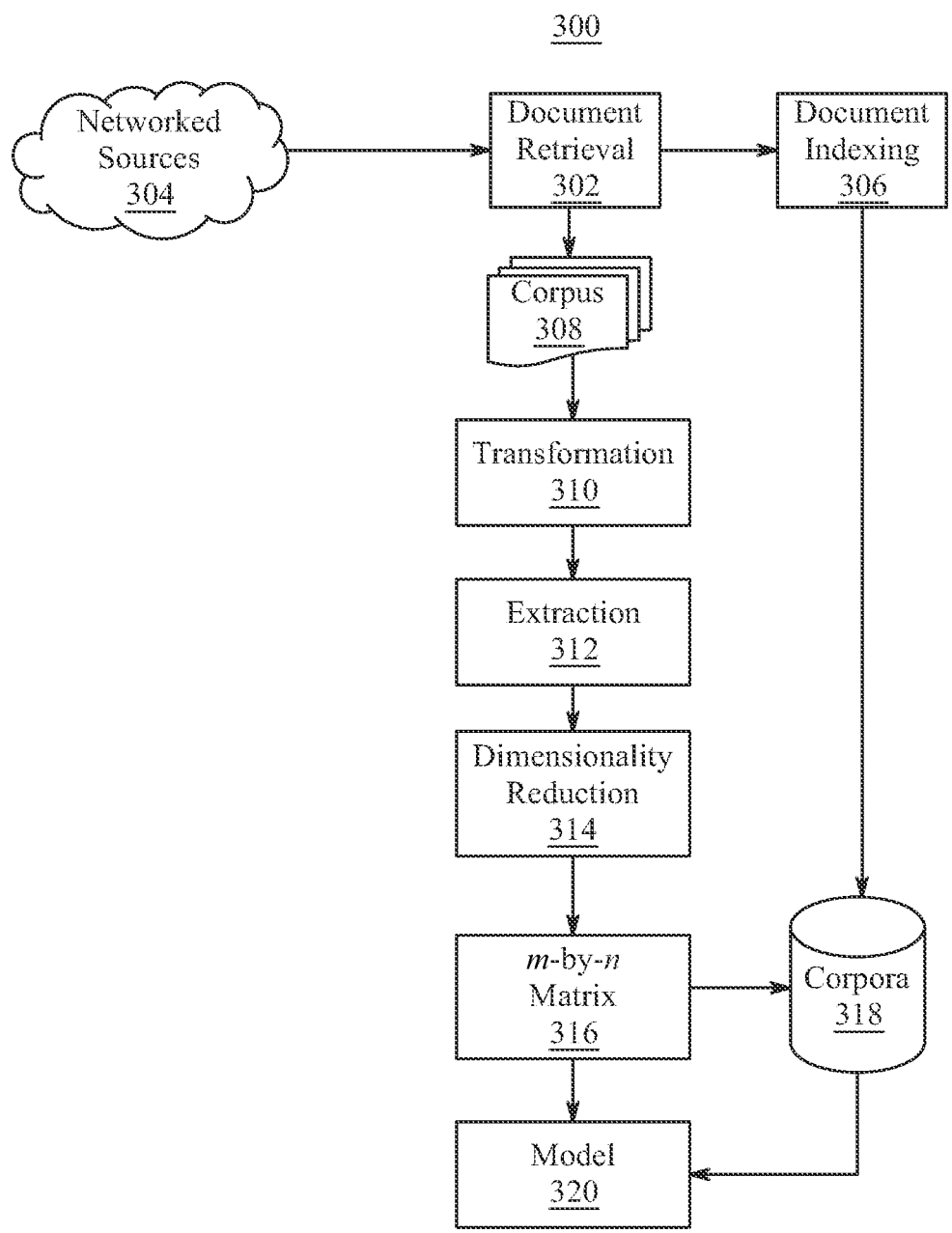
FIG. 3 depicts certain operative features of a self-executing document revisor according to an embodiment.

Referring additionally to FIG. 3, certain generative aspects 300 of SEDR 200 are schematically illustrated. At block 302, SEDR 200 retrieves domain-specific documents from one or more networked sources 304 (e.g., enterprise-wide collaborative systems) via one or more data communications networks. The documents are indexed at block 306 and processed into machine-usable data for generating one or more models. The models may be machine learning models. With respect to a specific series of revisions of a collaborative document, comprising corpus 308, each revision undergoes a transformation by SEDR 200 at block 310. Transformation at block 310 can include removing or replacing misspelled terms. At block 310, transformation can include reducing terms of a document version to their base or dictionary form by lemmatizing terms. Transformation at 310 can include stemming terms to reduce the inflectional forms and derivationally related forms of the terms.

At block 312, SEDR 200 performs an extraction to filter out or remove stop words (e.g., "a," "and," "but," "how," "or," and "what"). Stop words are typically the most common words that given their non-specificity tend to slow rather than enhance natural language processing.

At block 314, SEDR 200 reduces the dimensionality of each version of the collaborative document. SEDR 200 in certain embodiments performs Principal Component Analysis (PCA) to reduce the dimensionality. SEDR 200 in some embodiments reduces a collaborative document version's dimensionality by reducing the text of the document to an n-element vector. Each element of the vector corresponds to one of n terms (the vocabulary, or key terms, of the text) and indicates the number of times that the corresponding term appears in the document. With each version of the collaborative document reduced to a vector, SEDR 200 can aggregate the vectors into an m-by-n matrix 316 representation of corpus 308, wherein each of the m rows corresponds to a specific version of the collaborative document. Corpus 308, represented by matrix 316, can be added to corpora 318 generated from other indexed collaborative documents grouped according to the specific domain of each. Corpus 308, represented by matrix 316, may be analyzed by SEDR 200 using one or more machine learning models 320 for performing topic modeling and natural language understanding as already described. In various embodiments, the machine learning models can perform a regression, classification, and/or clustering for analyzing collaborative documents.

SEDR 200 in certain embodiments additionally outputs a map that is presented visually on a screen or other display, such as display 924, which is communicatively coupled to a device such as computer system 912 (FIG. 9). The map comprises multiple entries, each including a link for linking to a revision of a segment of a version of a document that was promoted by content promoter 210 into a user-revised version of the document. As each revision is made, SEDR 200 electronically stores the revised version and corresponding promoted segment in a document corpus with a timestamp of the time of the revision and content promotion. The map entries include the timestamp as well as link to specific versions and corresponding segment electronically stored in the document corpus. The map is updated with each new version and corresponding segment added to the document corpus, providing users with a kind of dynamically moving roadmap of a document's journey through a succession of revisions.

Figure 4:
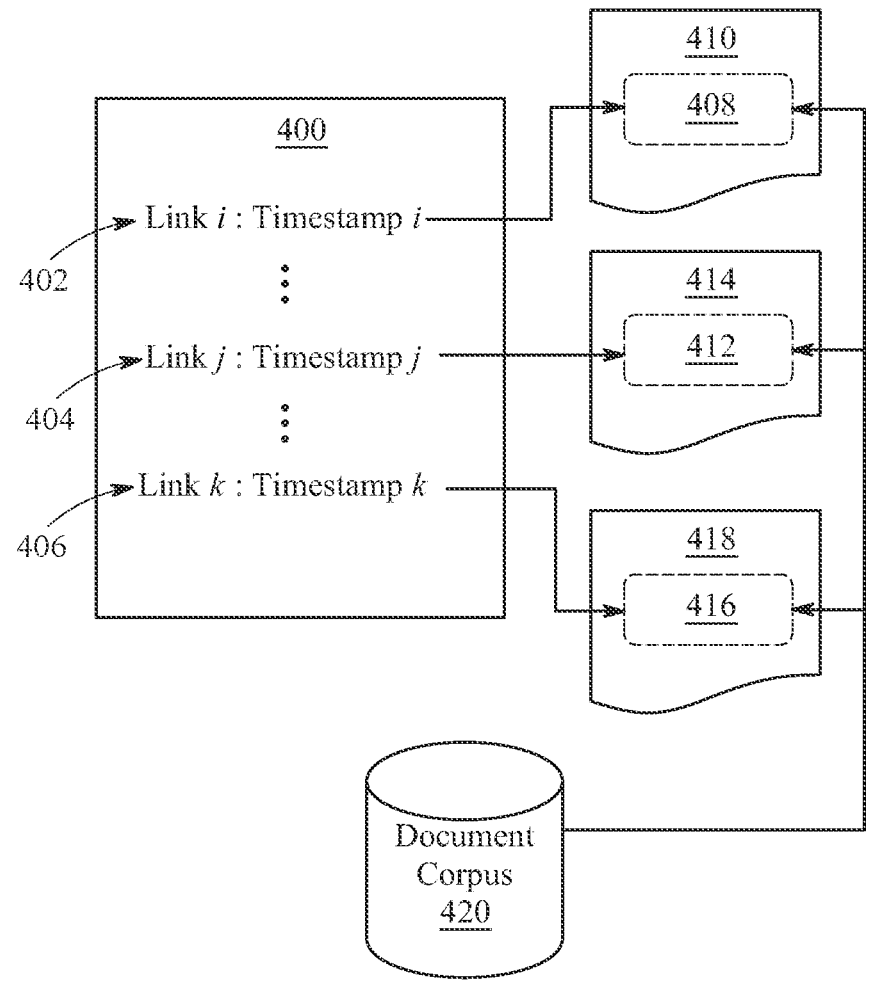
FIG. 4 depicts a map generated by a self-executing document revisor according to an embodiment.

Referring additionally to FIG. 4, example visual map 400 generated by graphical representation generator 212 is depicted. Visual map 400 comprises a plurality of entries, illustrated specifically by entries 402, 404, and 406. Each entry comprises a link to an earlier stored document revision in which a segment was promoted by content promoter 210 into a revised version of the document. Each entry further includes a timestamp that indicates the timing of revisions when each segment was promoted to a version of the document. Entry 402 links to a revision in which segment 408 was promoted to version 410 of the document, entry 404 links to a revision in which segment 412 was promoted to version 414, and entry 406 links to a revision in which segment 416 was promoted to version 418. The links provide a communicative coupling with document corpus 420, in which each successive version and promoted segment with a corresponding timestamp are electronically stored. Visual map 400 thus provides a dynamically changing visual that tracks the revisionary changes to the document over the document's lifecycle.

In other embodiments, SEDR 200 electronically monitors user interactions with the collaborative document. User interactions include revisions to the collaborative document, views of segments of the document, comments on the document, posts to a collaborative system relating to the document, electronic messages (e.g., emails) pertaining to the document, and the like. Graphical representation generator 212 further generates collaborative data based on user interactions and corresponding to each of the one or more segments selected and merged into the documents by content promoter 210. As defined herein, "collaborative data" includes any data that describes, explains, or characterizes revisions to a document based on one or more user interactions. The collaborative data can include, for example, a view count that indicates the number of times that a specific segment of the document (including prior revisions) has been viewed by one or more users. The collaborative data can include, for example, a revision count that indicates the number of times a specific segment of the current version of the document has been revised.

Graphical representation generator 212, in certain embodiments, annotates the graphical representation to include a notation of the collaborative data. In other embodiments, graphical representation generator 212 displays collaborative data by formatting and/or highlighting the one or more segments selected and merged to indicate collaborative data such as how many times a segment of the document has been viewed, revised, or otherwise consumed.

Figure 5:
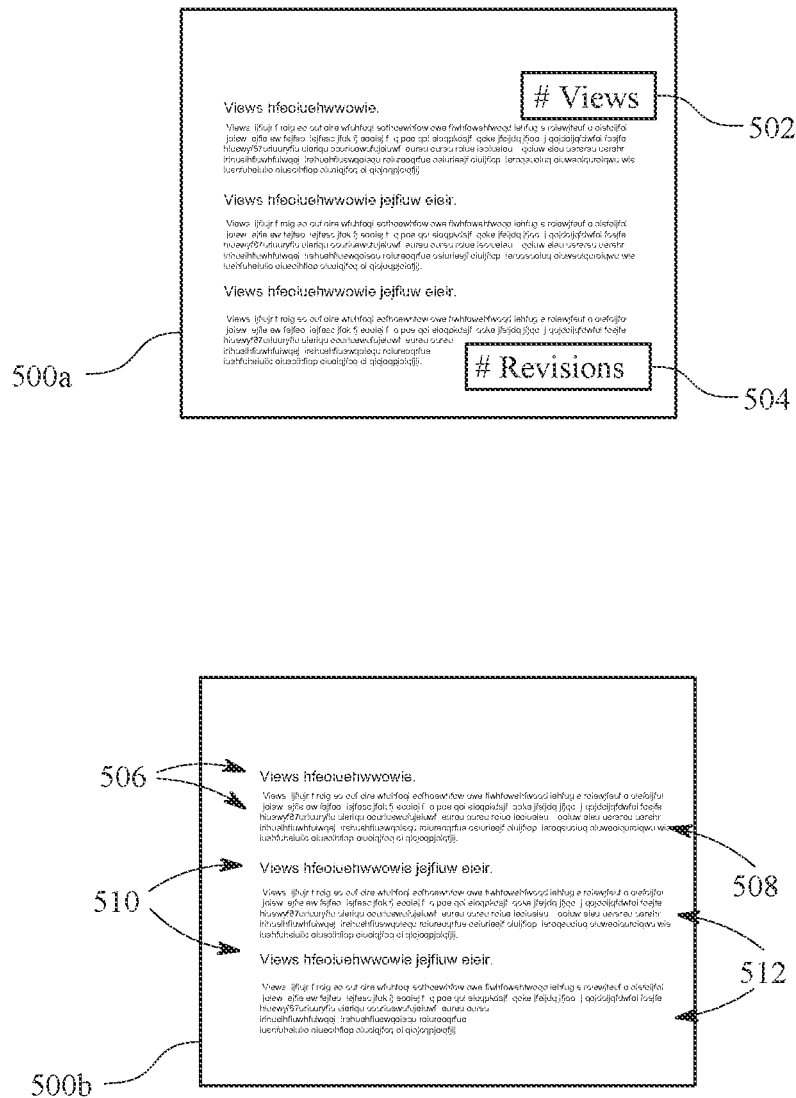
FIG. 5 depicts a graphical representation of a revised collaborative document, the graphical representation generated by a self-executing document revisor according to an embodiment.

Referring additionally to FIG. 5, example graphical representations 500*a* and 500*b* generated by graphical representation generator 212 are depicted, each graphical representation corresponding to a current version of a document. A first segment shown in graphical representation 500*a* is illustratively annotated with annotation 502 indicating the number of times the segment has been viewed (e.g., read or consumed). A subsequent segment of the graphical representation 500*a* is illustratively annotated with annotation 504 indicating the number of times the segment has been revised. Other annotations in accordance with other embodiments can indicate that the content was automatically promoted by content promoter 210, the content comprising a stored segment of an earlier version of the document. The annotation optionally includes an indication of the reason(s) (e.g., number of key terms, number of comments, number of views) for promoting the content.

Segments of graphical representation 500*b* are illustratively shaded differently. The differences in shading can indicate the number of times a corresponding segment has been revised or viewed. For example, shading 506 of the indicated segments can indicate that the segments were each revised at least 5 times, shading 508 can indicate at least 10 revisions to the indicated segments, shading 510 can indicate at least 15 revisions, and shading 512 can indicate at least 20 revisions. Additionally, or alternatively, graphical representation generator 212 can use formatting to indicate collaborative data such as how many times a segment of the document has been viewed or revised. In other embodiments, different shading can correspond to the specific reason (e.g., number of key terms, number of comments, number of views) that the shaded content was promoted by content promoter 210.

SEDR 200 in certain embodiments operatively couples with a messaging system of one or more users engaged in working on a collaborative document. Operatively connected with a messaging system, SEDR 200 can detect an electronic message (e.g., an electronic mail, a text message, a post to a collaborative Website, etc.) conveyed via the messaging system, the electronic message corresponding to one or more segments of a version of the document. Topic modeler 204 determines the topic or topics of the message by performing topic modeling with respect to the text of the message. SEDR 200 generates a link that links the message to the one or more segments of the subject document that pertain to the topic(s).

In still other embodiments, the graphical representation generated by graphical representation generator 212 displays a control element within a graphical user interface (e.g., visual depiction of a switch or button) that enables a user (e.g., by clinking on or hovering over the control element) to link one or more of segments selected by relevancy determiner 208 with one or more comments corresponding to the segment(s). The control element can include an expand option to visually expand the one or more corresponding comments and a collapse option to hide the one or more corresponding comments.

FIG. 6 is a flowchart of example method 600 for revising a document using an SEDR according to an embodiment. Method 600 can be performed by the same or similar systems as described with reference to FIGS. 1-5, which correspond to certain features and operative aspects of an SEDR implemented in hardware, software, or a combination thereof.

The system at block 602 creates, as an electronic rendering, a current version of a collaborative document based on input received from a user via a communicative coupling with a data communications network. The user can be one of multiple users that jointly work on the document using a collaborative system to which the users are linked via the data communications network. Operatively, the system actively monitors users' collaborative activities relating the collaborative document, compiling on an on-going basis collaborative data. Collaborative data can correspond to electronic messages, posts, revisions to one or more segments of a version of the collaborative document, and other such collaborative activities.

At block 604, the system determines the relevancy of the current version of the collaborative document and compares the relevancy of the current version with a relevancy of a prior version of the collaborative document. The system can determine the relevancies using a self-executing document revisor that determines the relevance of a version of a document as a whole based on relevancies of distinct segments of the document. Accordingly, the self-executing document revisor can include a segmenter (such as SEDR 200 segmenter 202) for segmenting a document into distinct segments and a self-executing document revisor relevancy determiner (such as SEDR 200 relevancy determiner 208) for determining the relevancies of each segment (FIG. 2).

In other embodiments, the relevancy of each of the one or more segments is based, at least in part, on an amount of time one or more of a plurality of users spends viewing each segment. The system can determine the amount of time based on eye gaze tracking.

In other embodiments, the relevancy of each of the one or more segments is based, at least in part, on a number of positive comments, less a number of negative comments, each segment garners. The system can determine whether each comment is positive, negative, or neutral by performing sentiment analysis on each comment.

In still other embodiments, the relevancy of each of the one or more segments is based, at least initially, on a number of terms having a probabilistic relevance greater than a predetermined probability value. The system can determine probabilistic relevance by performing topic modeling using a topic modeler (such as SEDR 200 topic modeler 204) that determines the probabilistic relevancy of terms corresponding to predetermined topics (FIG. 2). The system can enable users to specify the specific topics that a collaborative document is to include. Users can specify the specific topics contemporaneously with an initial version of a collaborative document. Accordingly, the initial relevance of the collaborative document can correspond to the number of terms corresponding to each topic that have a probabilistic relevance equal to or greater than a predetermined value.

At block 606, the system determines the relevancy of the current version is less than the relevancy of the prior version and selects one or more segments of one or more electronically stored versions of the collaborative document based on a relevancy of each of the one or more segments for promoting to a current version of a document using a self-executing document revisor content promoter (such as SEDR 200 content promoter 210).

At block 608, the system generates a graphical representation of a revised version of the collaborative document. The graphical representation of the revised version of the document can be generated by the system using a self-executing document revisor graphical representation generator (such as SEDR 200 graphical representation generator 212), which merges the one or more segments selected with the current version of the collaborative document generated from the user input (FIG. 2).

Optionally, the system generates a display comprising a visual map corresponding to multiple revisions of one or more segments of the collaborative document. The visual map can be generated by the system using a self-executing document revisor, which generates a map (such as visual map 400) that comprises a plurality of entries (FIG. 4). Each entry provides a link (e.g., an electronic hyper link) to each electronically stored segment promoted into a document version as part of revision of the document and a corresponding timestamp indicating when the revision was made and the segment promoted. The visual map can be rendered as part of a graphical user interface.

In certain embodiments, the system generates collaborative data by electronically monitoring user interactions with the collaborative document. The collaborative data indicates a condition causing the selecting and merging of one or more segments in a version of the collaborative document. The collaborative data can be displayed in the graphical representation by formatting, annotating, and/or highlighting the one or more segments selected and merged in the collaborative document.

The collaborative data generated thus corresponds to the one or more segments that the system selects and merges into the current version of the collaborative document. The collaborative data can include, for example, a view count. The collaborative data can include, for example, a revision count. The system can include the collaborative data in the display of the graphical representation, for example, in a graphical user interface (FIG. 5). The system can generate the graphical representation in a format, font, and/or style that corresponds to the collaborative data to indicate, for example, how often one or more segments is viewed and/or revised. The system can generate the graphical representation with annotations indicating collaborative data. The system can highlight or shade sections of the graphical representation to indicate collaborative data pertaining to one or more segments of the document displayed by the graphical representation.

In other embodiments, the system can operatively couple with a messaging system of one or more users who collaborate on the document. The system, operatively coupled with the messaging system, detects a message conveyed by the messaging system. The system can determine the topic(s) corresponding to one or more segments of the current version by performing topic modeling of the message. The system can link the message to one or more segments corresponding to the topic(s).

The system in still other embodiments, can overlay or incorporate in the display of the graphical representation a control element. The control element enables a user to link one or more of the segments of the collaborative document with one or more corresponding comments. The control element can provide an expand option to visually expand the one or more corresponding comments and a collapse option to hide the one or more corresponding comments.

It is expressly noted that although this disclosure includes a detailed description on cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
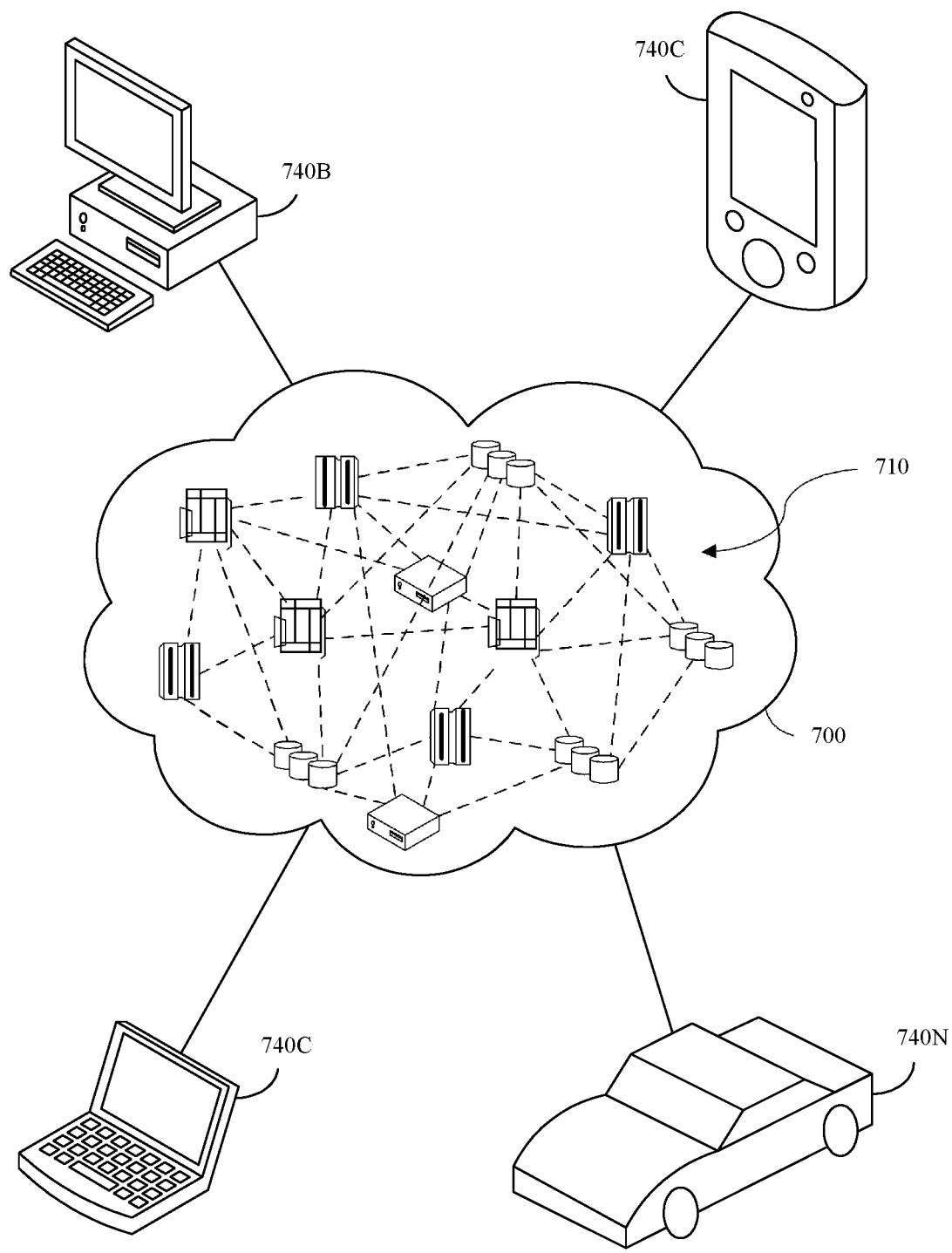
FIG. 7 depicts a cloud computing environment according to an embodiment.

Referring now to FIG. 7, illustrative cloud computing environment 700 is depicted. As shown, cloud computing environment 700 includes one or more cloud computing nodes 710 with which local computing devices used by cloud consumers, such as, for example, personal digital assistant (PDA) or cellular telephone 740a, desktop computer 740b, laptop computer 740c, and/or automobile computer system 740n may communicate. Computing nodes 710 may communicate with one another. They may be grouped (not shown) physically or virtually, in one or more networks, such as Private, Community, Public, or Hybrid clouds as described hereinabove, or a combination thereof. This allows cloud computing environment 700 to offer infrastructure, platforms and/or software as services for which a cloud consumer does not need to maintain resources on a local computing device. It is understood that the types of computing devices 740a-n shown in FIG. 7 are intended to be illustrative only and that computing nodes 710 and cloud computing environment 700 can communicate with any type of computerized device over any type of network and/or network addressable connection (e.g., using a web browser).

Figure 8:
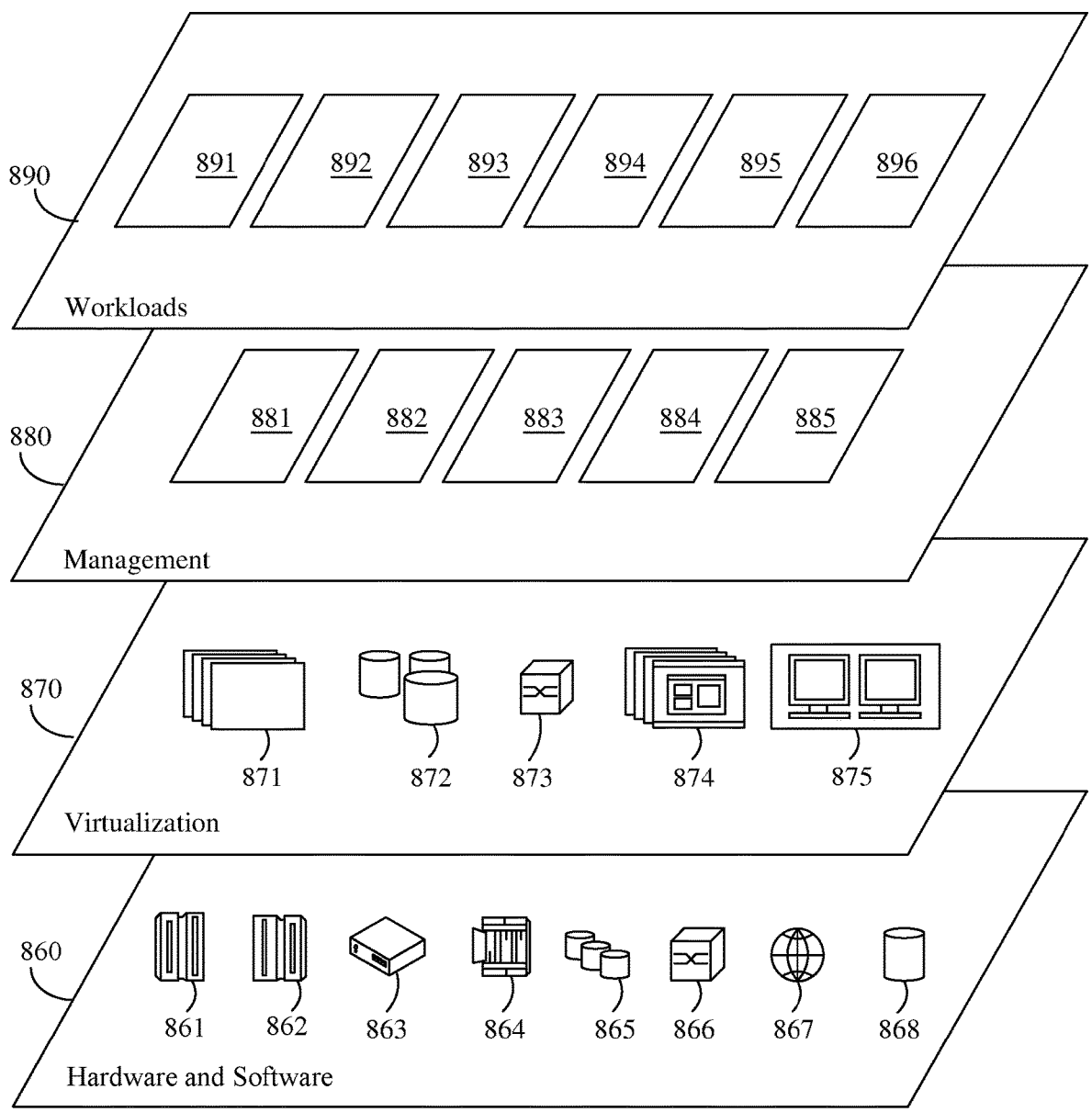
FIG. 8 depicts abstraction model layers according to an embodiment.

Referring now to FIG. 8, a set of functional abstraction layers provided by cloud computing environment 700 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include mainframes 861; RISC (Reduced Instruction Set Computer) architecture-based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and SEDR 896.

FIG. 9 illustrates a schematic of an example of a computing node 900. In one or more embodiments, computing node 900 is an example of a suitable cloud computing node. Computing node 900 is not intended to suggest any limitation as to the scope of use or functionality of embodiments of the invention described herein. Computing node 900 is capable of performing any of the functionality described within this disclosure.

Computing node 900 includes a computer system 912, which is operational with numerous other general-purpose or special-purpose computing system environments or configurations. Examples of well-known computing systems, environments, and/or configurations that may be suitable for use with computer system 912 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 912 may be described in the general context of computer system-executable instructions, such as program modules, being executed by a computer system. Generally, program modules may include routines, programs, objects, components, logic, data structures, and so on that perform particular tasks or implement particular abstract data types. Computer system 912 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system 912 is shown in the form of a general-purpose computing device. The components of computer system 912 may include, but are not limited to, one or more processors 916, a memory 928, and a bus 918 that couples various system components including memory 928 to processor 916. As defined herein, "processor" means at least one hardware circuit configured to carry out instructions. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

The carrying out of instructions of a computer program by a processor comprises executing or running the program. As defined herein, "run" and "execute" comprise a series of actions or events performed by the processor in accordance with one or more machine-readable instructions. "Running" and "executing," as defined herein refer to the active performing of actions or events by the processor. The terms run, running, execute, and executing are used synonymously herein.

Bus 918 represents one or more of any of several types of bus structures, including a memory bus or memory controller, a peripheral bus, an accelerated graphics port, and a processor or local bus using any of a variety of bus architectures. By way of example only, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer system 912 typically includes a variety of computer system-readable media. Such media may be any available media that is accessible by computer system 912, and may include both volatile and non-volatile media, removable and non-removable media.

Memory 928 may include computer system readable media in the form of volatile memory, such as random-access memory (RAM) 930 and/or cache memory 932. Computer system 912 may further include other removable/non-removable, volatile/non-volatile computer system storage media. By way of example, storage system 934 can be provided for reading from and writing to a non-removable, non-volatile magnetic media and/or solid-state drive(s) (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 918 by one or more data media interfaces. As will be further depicted and described below, memory 928 may include at least one program product having a set (e.g., at least one) of program modules that are configured to carry out the functions of embodiments of the invention.

Program/utility 940, having a set (at least one) of program modules 942, may be stored in memory 928 by way of example, and not limitation, as well as an operating system, one or more application programs, other program modules, and program data. Each of the operating system, one or more application programs, other program modules, and program data or some combination thereof, may include an implementation of a networking environment. Program modules 942 generally carry out the functions and/or methodologies of embodiments of the invention as described herein. For example, one or more of the program modules may include SEDR 896 or portions thereof.

Program/utility 940 is executable by processor 916. Program/utility 940 and any data items used, generated, and/or operated upon by computer system 912 are functional data structures that impart functionality when employed by computer system 912. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer system 912 may also communicate with one or more external devices 914 such as a keyboard, a pointing device, a display 924, camera 944, etc.; one or more devices that enable a user to interact with computer system 912; and/or any devices (e.g., network card, modem, etc.) that enable computer system 912 to communicate with one or more other computing devices. Such communication can occur via input/output (I/O) interfaces 922. Still, computer system 912 can communicate with one or more networks such as a local area network (LAN), a general wide area network (WAN), and/or a public network (e.g., the Internet) via network adapter 920. As depicted, network adapter 920 communicates with the other components of computer system 912 via bus 918. It should be understood that although not shown, other hardware and/or software components could be used in conjunction with computer system 912. Examples, include, but are not limited to: microcode, device drivers, redundant processing units, external disk drive arrays, RAID systems, tape drives, and data archival storage systems, etc.

While computing node 900 is used to illustrate an example of a cloud computing node, it should be appreciated that a computer system using an architecture the same as or similar to that described in connection with FIG. 9 may be used in a non-cloud computing implementation to perform the various operations described herein. In this regard, the example embodiments described herein are not intended to be limited to a cloud computing environment. Computing node 900 is an example of a data processing system. As defined herein, "data processing system" means one or more hardware systems configured to process data, each hardware system including at least one processor programmed to initiate operations and memory.

Computing node 900 is an example of computer hardware. Computing node 900 may include fewer components than shown or additional components not illustrated in FIG. 9 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Computing node 900 is also an example of a server. As defined herein, "server" means a data processing system configured to share services with one or more other data processing systems. As defined herein, "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. In one or more embodiments, the various user devices described herein may be client devices. Network infrastructure, such as routers, firewalls, switches, access points and the like, are not client devices as the term "client device" is defined herein.

The terminology used herein is for the purpose of describing particular embodiments only and is not intended to be limiting. Notwithstanding, several definitions that apply throughout this document now will be presented.

As defined herein, the singular forms "a," "an," and "the" include the plural forms as well, unless the context clearly indicates otherwise.

As defined herein, "another" means at least a second or more.

As defined herein, "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, "automatically" means without user intervention.

As defined herein, "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, "if" means "in response to" or "responsive to," depending upon the context. Thus, the phrase "if it is determined" may be construed to mean "in response to determining" or "responsive to determining" depending on the context. Likewise the phrase "if [a stated condition or event] is detected" may be construed to mean "upon detecting [the stated condition or event]" or "in response to detecting [the stated condition or event]" or "responsive to detecting [the stated condition or event]" depending on the context.

As defined herein, "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the phrases "in response to" and "responsive to" mean responding or reacting readily to an action or event. Thus, if a second action is performed "in response to" or "responsive to" a first action, there is a causal relationship between an occurrence of the first action and an occurrence of the second action. The phrases "in response to" and "responsive to" indicate the causal relationship.

As defined herein, "real time" means a level of processing responsiveness that a user or system senses as sufficiently immediate for a particular process or determination to be made, or that enables the processor to keep up with some external process.

As defined herein, "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, "user" and "individual" each refer to a human being.

The terms first, second, etc. may be used herein to describe various elements. These elements should not be limited by these terms, as these terms are only used to distinguish one element from another unless stated otherwise or the context clearly indicates otherwise.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   creating a current version of an electronic rendering of a collaborative document based on input received from a user via a communicative coupling with a data communications network;
   determining with a self-executing document revisor a relevancy of the current version of the collaborative document and comparing the relevancy of the current version with a relevancy of a prior version of the collaborative document;
   responsive to determining the relevancy of the current version is less than the relevancy of the prior version, selecting one or more segments of one or more electronically stored versions of the collaborative document based on a relevancy of each of the one or more segments, wherein the relevancy of each of the one or more segments is determined by the self-executing document revisor; and
   generating with the self-executing document revisor a graphical representation of a revised version of the collaborative document in which the one or more segments selected are merged with the current version of the collaborative document.

2. The method of claim 1, wherein the relevancy of each of the one or more segments is based, at least in part, on an amount of time one or more of a plurality of users spends viewing each segment, the amount of time determined based on eye gaze tracking.

3. The method of claim 1, wherein the relevancy of each of the one or more segments is based, at least in part, on a number of positive comments, less a number of negative comments, each segment garners, wherein the self-executing document revisor determines whether each comment is positive, negative, or neutral by performing sentiment analysis on each comment.

4. The method of claim 1, wherein the relevancy of each of the one or more segments is based, at least initially, on a number of terms having a probabilistic relevance greater than a predetermined probability value, wherein the self-executing document revisor determines probabilistic relevance by performing topic modeling.

5. The method of claim 1, further comprising generating a display comprising a visual map corresponding to a plurality of revisions of one or more segments of the collaborative document, wherein the visual map comprises a link to each of the plurality of revisions and a corresponding timestamp.

6. The method of claim 1, further comprising generating collaborative data by electronically monitoring user interactions with the collaborative document, wherein the collaborative data indicates a condition causing the selecting and merging, and wherein the collaborative data is displayed in the graphical representation by formatting, annotating, and/or highlighting the one or more segments selected and merged.

7. The method of claim 1, further comprising operatively coupling with a messaging system of one or more of the plurality of users, detecting a message conveyed by the messaging system and corresponding to one or more segments of the current version by performing topic modeling of the message, and linking the message to the one or more segments.

8. A system, comprising:
a processor configured to initiate operations including:
creating a current version of an electronic rendering of a collaborative document based on input received from a user via a communicative coupling with a data communications network;
determining a relevancy of the current version of the collaborative document and comparing the relevancy of the current version with a relevancy of a prior version of the collaborative document;
responsive to determining the relevancy of the current version is less than the relevancy of the prior version, selecting one or more segments of one or more electronically stored versions of the collaborative document based on a relevancy of each of the one or more segments; and
generating a graphical representation of a revised version of the collaborative document in which the one or more segments selected are merged with the current version of the collaborative document.

9. The system of claim 8, wherein the relevancy of each of the one or more segments is based, at least in part, on an amount of time one or more of a plurality of users spends viewing each segment, the amount of time determined based on eye gaze tracking.

10. The system of claim 8, wherein the relevancy of each of the one or more segments is based, at least in part, on a number of positive comments less a number of negative comments each segment garners, wherein the self-executing document revisor determines whether each comment is positive, negative, or neutral by performing sentiment analysis on each comment.

11. The system of claim 8, wherein the relevancy of each of the one or more segments is based, at least initially, on a number of terms having a probabilistic relevance greater than a predetermined probability value, wherein the self-executing document revisor determines probabilistic relevance by performing topic modeling.

12. The system of claim 8, wherein the processor is configured to initiate operations further including generating a display comprising a visual map corresponding to a plurality of revisions of one or more segments of the collaborative document, wherein the visual map comprises a link to each of the plurality of revisions and a corresponding timestamp.

13. The system of claim 8, wherein the processor is configured to initiate operations further including generating collaborative data by electronically monitoring user interactions with the collaborative document, wherein the collaborative data indicates a condition causing the selecting and merging, and wherein the collaborative data is displayed in the graphical representation by formatting, annotating, and/or highlighting the one or more segments selected and merged.

14. A computer program product, the computer program product comprising:
one or more computer-readable storage media and program instructions collectively stored on the one or more computer-readable storage media, the program instructions executable by a processor to cause the processor to initiate operations including:
creating a current version of an electronic rendering of a collaborative document based on input received from a user via a communicative coupling with a data communications network;
determining with a self-executing document revisor a relevancy of the current version of the collaborative document and comparing the relevancy of the current version with a relevancy of a prior version of the collaborative document;
responsive to determining the relevancy of the current version is less than the relevancy of the prior version, selecting one or more segments of one or more electronically stored versions of the collaborative document based on a relevancy of each of the one or more segments, wherein the relevancy of each of the one or more segments is determined by the self-executing document revisor; and
generating with the self-executing document revisor a graphical representation of a revised version of the collaborative document in which the one or more segments selected are merged with the current version of the collaborative document.

15. The computer program product of claim 14, wherein the relevancy of each of the one or more segments is based, at least in part, on an amount of time one or more of a plurality of users spends viewing each segment, the amount of time determined based on eye gaze tracking.

16. The computer program product of claim 14, wherein the relevancy of each of the one or more segments is based, at least in part, on a number of positive comments less a number of negative comments each segment garners, wherein the self-executing document revisor determines whether each comment is positive, negative, or neutral by performing sentiment analysis on each comment.

17. The computer program product of claim 14, wherein the relevancy of each of the one or more segments is based, at least initially, on a number of terms having a probabilistic relevance greater than a predetermined probability value, wherein the self-executing document revisor determines probabilistic relevance by performing topic modeling.

18. The computer program product of claim 14, wherein the program instructions are executable by the processor to cause the processor to initiate operations further including generating a display comprising a visual map corresponding to a plurality of revisions of one or more segments of the collaborative document, wherein the visual map comprises a link to each of the plurality of revisions and a corresponding timestamp.

19. The computer program product of claim 14, wherein the program instructions are executable by the processor to cause the processor to initiate operations further including generating collaborative data by electronically monitoring user interactions with the collaborative document, wherein the collaborative data indicates a condition causing the selecting and merging, and wherein the collaborative data is displayed in the graphical representation by formatting, annotating, and/or highlighting the one or more segments selected and merged.

20. The computer program product of claim 14, wherein the program instructions are executable by the processor to cause the processor to initiate operations further including operatively coupling with a messaging system of one or more of a plurality of users, detecting a message conveyed by the messaging system and corresponding to one or more segments of the current version by performing topic modeling of the message, and linking the message to the one or more segments.

\* \* \* \* \*